US010820263B1

(12) United States Patent
Barton et al.

(10) Patent No.: US 10,820,263 B1
(45) Date of Patent: Oct. 27, 2020

(54) QUALITY OF SERVICE (QOS) BASED WIRELESS COVERAGE MAP

(71) Applicant: Cisco Technology, Inc., San Jose, CA (US)

(72) Inventors: Robert E. Barton, Richmond (CA); Vishal Satyendra Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/566,450

(22) Filed: Sep. 10, 2019

(51) Int. Cl.
*H04W 4/00* (2018.01)
*H04W 48/16* (2009.01)
*H04W 48/20* (2009.01)
*H04L 12/24* (2006.01)
*H04W 24/10* (2009.01)
*H04W 84/12* (2009.01)
*H04W 24/02* (2009.01)

(52) U.S. Cl.
CPC ......... *H04W 48/16* (2013.01); *H04L 41/5003* (2013.01); *H04W 24/02* (2013.01); *H04W 24/10* (2013.01); *H04W 48/20* (2013.01); *H04W 84/12* (2013.01)

(58) Field of Classification Search
CPC .............................. H04W 36/18; H04W 64/00
See application file for complete search history.

(56) References Cited

U.S. PATENT DOCUMENTS

| | | | |
|---|---|---|---|
| 7,499,718 B2 | 3/2009 | Stephenson et al. | |
| 8,107,981 B2 | 1/2012 | Byun et al. | |
| 8,665,743 B2 | 3/2014 | Zhu et al. | |
| 8,774,791 B2 | 7/2014 | Hamalainen et al. | |
| 2006/0075131 A1* | 4/2006 | Douglas ................ | H04W 64/00 709/230 |
| 2014/0233544 A1* | 8/2014 | McCann ................ | H04W 48/18 370/338 |
| 2015/0230263 A1* | 8/2015 | Roy ...................... | H04W 16/28 455/452.2 |
| 2018/0167830 A1 | 6/2018 | Grischy et al. | |
| 2020/0036727 A1* | 1/2020 | Pegg ..................... | H04W 12/06 |

* cited by examiner

*Primary Examiner* — Omoniyi Obayanju
(74) *Attorney, Agent, or Firm* — Merchant & Gould P.C.

(57) ABSTRACT

A Quality of Service (QoS) based wireless coverage map may be provided. First, a station may be identified by an Access Point (AP) in a Wireless Local Area Network (WLAN). Next, a report request may be sent by the AP to the station in response to identifying the station. A report may then be received from the station in response to the report request. The report may comprise information. The information may comprise a location of the station and data indicating a strength of a signal from the AP at the station. A map may be created based on the received report. The map may indicate a hole in the coverage of the WLAN.

20 Claims, 5 Drawing Sheets

US 10,820,263 B1

QUALITY OF SERVICE (QOS) BASED WIRELESS COVERAGE MAP

TECHNICAL FIELD

The present disclosure relates generally to wireless access points.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
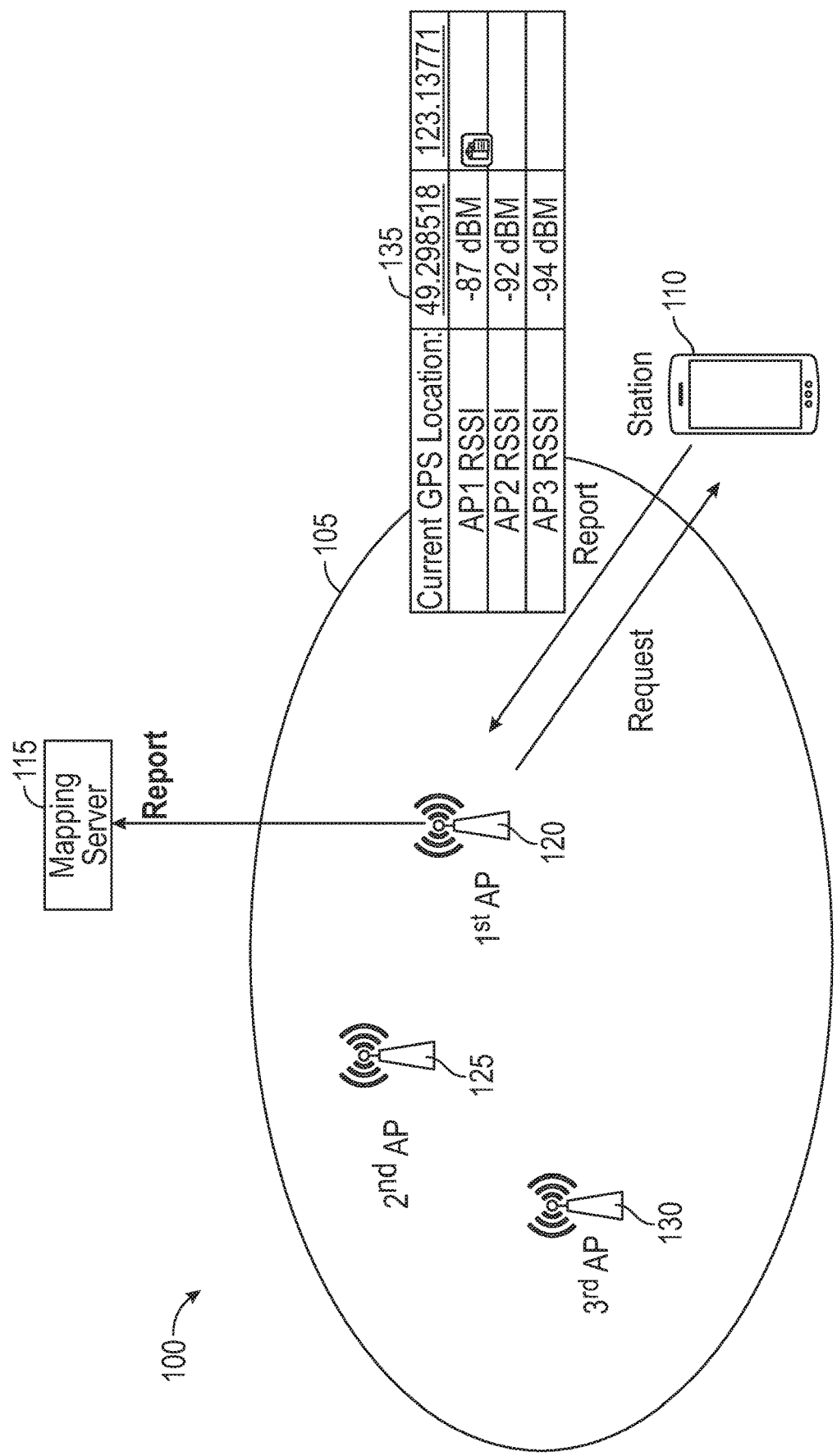
FIG. 1 is a block diagram of an operating environment.

A Quality of Service (QoS) based wireless coverage map may be provided. First, a station may be identified by an Access Point (AP) in a Wireless Local Area Network (WLAN). Next, a report request may be sent by the AP to the station in response to identifying the station. A report may then be received from the station in response to the report request. The report may comprise information. The information may comprise a location of the station and data indicating a strength of a signal from the AP at the station.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Service providers may deploy extensive public Wireless Local Area Networks (WLANs) (e.g., Wi-Fi) in parallel with their cellular networks in spaces such as smart cities, campuses, and convention centers for example. However, due to the size and shape of these spaces, many WLAN coverage dead spots (i.e., holes) may exist in these public areas. Moreover, even where WLAN coverage exists, the WLAN coverage may not be suitable for certain applications, such as higher Quality of Service (QoS) applications like voice and video that may need a stronger signal strength. In other words, some areas may comprise a dead spot for real time applications such as voice service, but may not comprise a dead spot for applications that just exchange data. For service providers, it may be challenging to find these dead spots and mitigate them with new or additional APs to cover them. Accordingly, embodiments of the disclosure may provide a process to create a "dark map" that may show where these dead spots may be according to a QoS level.

FIG. 1 shows an operating environment 100. As shown in FIG. 1, operating environment 100 may comprise a Wireless Local Area Network (WLAN) 105, a station 110, and a mapping server 115. WLAN 105 may comprise a first Access Point (AP) 120, a second AP 125, and a third AP 130. First AP 120, second AP 125, and third AP 130 may provide wireless network access (e.g., access to WLAN 105) for devices such as station 110. Station 110 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device. First AP 120, second AP 125, and third AP 130 may be compatible with specification standards such as the 802.11ax specification standard for example.

Consistent with embodiments of the disclosure, mapping server 115 may create a dark map for WLAN 105. The dark map may comprise a map indicating coverage holes in the coverage area of WLAN 105, for example, per access (e.g., QoS) category. A coverage hole may comprise an event where a station is outside the coverage boundaries of WLAN 105's APs. Embodiments of the disclosure may build a QoS aware dark map that may identify coverage areas of WLAN 105 based on the QoS from a station's view. For example, embodiments of the disclosure may identify holes (i.e., dead spots) for data services, voice services, and video services based on an AP density view from the station.

Embodiments of the disclosure may provide a dark map that may identify areas (i.e., dead spots) where WLAN 105 may be lacking coverage for basic data traffic. This may be accomplished, for example, by leveraging Wi-Fi Agile Multi-Band Operation (MBO). MBO may allow for dynamic monitoring of network (e.g., WLAN 105) conditions where client (e.g., station 110) and network infrastructure devices (e.g., first AP 120) may exchange information about the network environment. This may result in efficient utilization of network resources, increased network and device performance, and better end user experiences. Embodiments of the disclosure may further extend MBO to have stations send beacon reports on-demand, based on the infrastructure request. For example, when station 110 roams away from WLAN 105 to a cellular network, first AP 120 may initiate a beacon report request. Similarly, based on the traffic load, first AP 120 may periodically request a non-associated (but visible) station to report its view of the network infrastructure (e.g., first AP 120, second AP 125, and third AP 130).

In response to receiving the beacon report request, station 110 may scan its surrounding wireless medium and create a beacon report. In addition to the strength of a signal (e.g., the Received Signal Strength Indicator (RSSI)) from first AP 120, second AP 125, and third AP 130), station 110 may also include in the beacon report, location information (e.g., Global Positioning System (GPS) coordinates) corresponding to its current location. A report 135 shown in FIG. 1 may illustrate an example beacon report. Because station 110 may be at the edge of WLAN 105, 802.11 based Real-time locating systems (RTLS) may not be used.

Although station 110 may not be associated with an AP in WLAN 105, the beacon report, including the location information of station 110, may be reported (i.e., sent) to first AP 120. First AP 120 may pass the beacon report for station 110 to mapping server 115, noting that station 110 has roamed off WLAN 105. In other embodiments where station 110 may not support MBO, station 110 may initiate its own beacon report and transmit it to mapping server 115 over the cellular network.

Periodically, (as long as station 110 may be visible by first AP 120, but not associated with an AP in WLAN 105) first AP 120 may continue to request a report (e.g., request an MBO Beacon Report) from station 110. Thus, station 110 may continue to report its location (e.g., its GPS coordinates) along with the strength of signals of the APs in the beacon report to the mapping server 115 as station 110 moves.

The elements described above of operating environment 100 (e.g., station 110, mapping server 115, first AP 120, second AP 125, and third AP 130) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
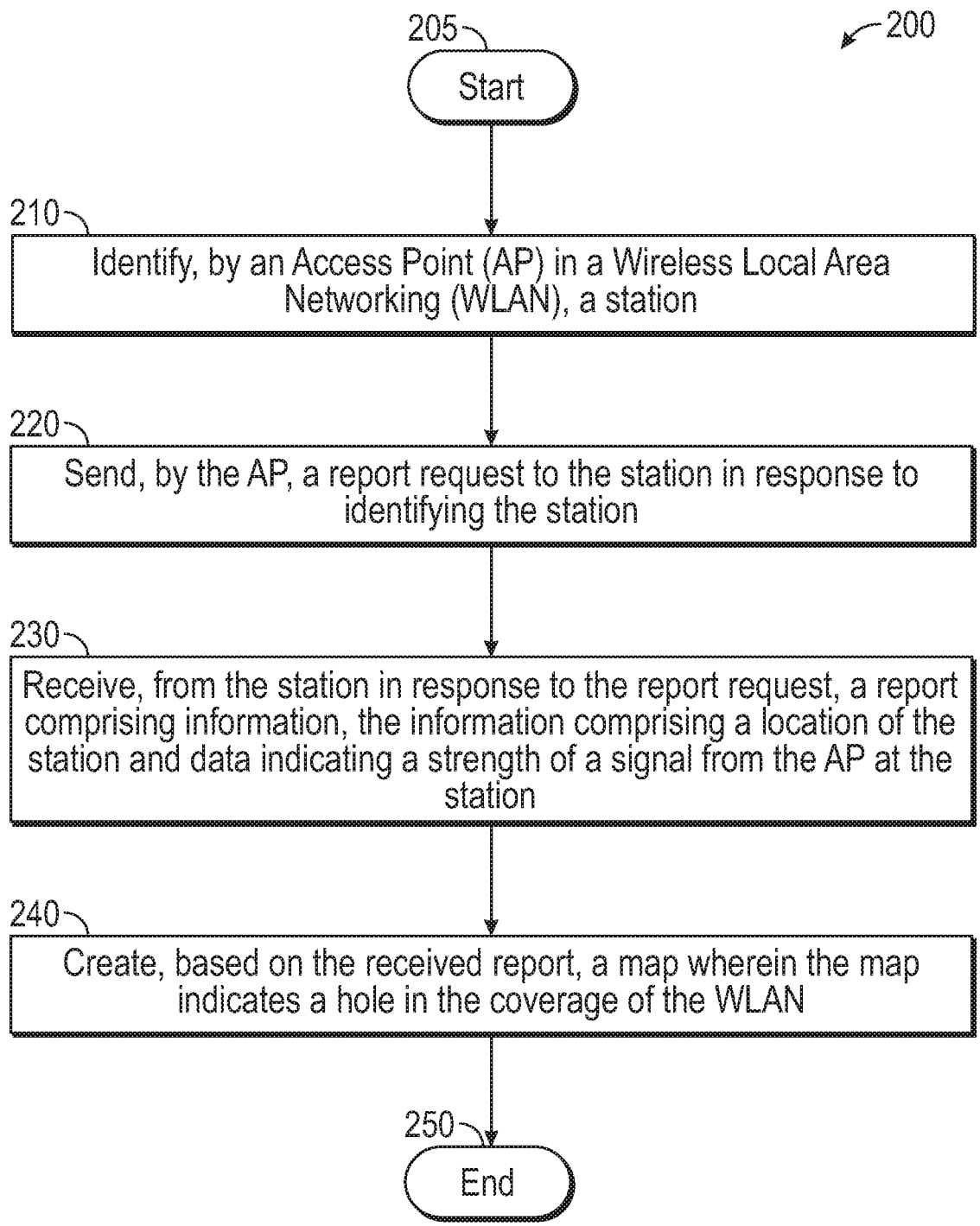
FIG. 2 is a flow chart of a method for providing a Quality of Service (QoS) based wireless coverage map.

FIG. 2 is a flow chart setting forth the general stages involved in a method 200 consistent with an embodiment of the disclosure for providing a Quality of Service (QoS) based wireless coverage map. Method 200 may be implemented using first access point 120 and mapping server 115 as described above with respect to FIG. 1. Ways to implement the stages of method 200 will be described in greater detail below.

Method 200 may begin at starting block 205 and proceed to stage 210 where first AP 120 may identify station 110. For example, station 100 may have roamed away from first AP 120 on WLAN 105 and may have roamed to a cellular network. Consistent with embodiments of the disclosure, first AP 120 may identify station 110 by determining that station 110 has roamed away from first AP 120. In other embodiments, in order to identify station 110, first AP 120 may periodically request a non-associated, but visible to first AP 120, station to report its view of WLAN 105's infrastructure (e.g., first AP 120, second AP 125, and third AP 130). In other words, during times of lower usage for example, first AP 120 may scan its surrounding wireless medium and see stations (e.g., station 110) that may not be associated with first AP 120. First AP 120 may identify these non-associated, yet visible stations as stations that could report their view of WLAN 105's infrastructure.

From stage 210, where first AP 120 identifies station 110, method 200 may advance to stage 220 where first AP 120 may send a report request to station 110 in response to identifying station 110. For example, once identified as a station that could report its view of WLAN 105 infrastructure, first AP 120 may send a report request to station 110. The report request may comprise, but is not limited to, an MBO beacon report request.

Once first AP 120 sends the report request to station 110 in response to identifying station 110 in stage 220, method 200 may continue to stage 230 where first AP 120 may receive, from station 110 in response to the report request, a report 135 comprising information. The information may comprise a location of station 110 and data indicating a strength of a signal from first AP 120 at station 110. For example, in response to receiving the report request, station 110 may scan its surrounding wireless medium and create a report. The report may comprise an MBO beacon report for example. In addition to the strength of a signal (e.g., an RSSI) from first AP 120, second AP 125, and third AP 130, station 110 may also include in the beacon report, location information (e.g., GPS coordinates) corresponding to its current location.

FIG. 1 illustrates an example report 135 (e.g., beacon report). As shown in the example of FIG. 1, station 110 may provide its current location as latitude 49.298518 and longitude 123.13771. GPS coordinates are an example and station 110 may provide its current location using processes other than GPS and may use indicators other than coordinates. Also as illustrated in FIG. 1, report 135 may include the strength of the signal from first AP 120, second AP 125, and third AP 130 as seen by station 110 at its current location. These strengths of the signals may comprise, for example, an RSSI of −87 dBM for first AP 120 (i.e., AP1), an RSSI of −92 dBM for second AP 125 (i.e., AP2), and an RSSI of −94 dBM for third AP 130 (i.e., AP3). Although station 110 may not be associated with an AP in WLAN 105, report 135, including the location information of station 110, may be reported to first AP 120.

Periodically, (as long as station 110 may be visible by first AP 120, but not associated with an AP in WLAN 105) first AP 120 may continue to request a report (e.g., request an MBO Beacon Report plus location) from station 110. Thus, station 110 may continue to report its location (e.g., its GPS coordinates) along with the strength of signals of WLAN 105's APs in beacon reports to first AP 120 as station 110 moves.

Consistent with embodiments of the disclosure, station 110 may send report 135 to first AP 120 that may forward it to mapping server 115 noting that station 110 has roamed off WLAN 105. In other embodiments, station 110 may send report 135 to mapping server 115 over a network other than WLAN 105, for example, a cellular network to which station 110 may have roamed. In other embodiments where station 110 may not support MBO, station 110 may initiate its own beacon report and transmit it to mapping server 115 over the cellular network.

After first AP 120 receives, from station 110 in response to the report request, report 135 comprising information in stage 230, method 200 may proceed to stage 240 where mapping server 115 may create, based on received report 135, a map. The map may indicate a hole or holes in the coverage of WLAN 105. For example, mapping server 115 may create a dark map for WLAN 105 that may comprise a map indicating coverage holes in the coverage area of WLAN 105, for example, per access (e.g., QoS) category. A coverage hole may comprise an event where a station is outside the coverage boundaries of WLAN 105's APs. Embodiments of the disclosure may build a QoS aware dark map that may identify coverage areas of WLAN 105 based on the QoS from a station's view. For example, embodiments of the disclosure may identify holes (i.e., dead spots) for QoS levels comprising, but not limited to, data services, voice services, and video (e.g., High Definition (HD) video) services based on an AP density view from the station.

Figure 3:
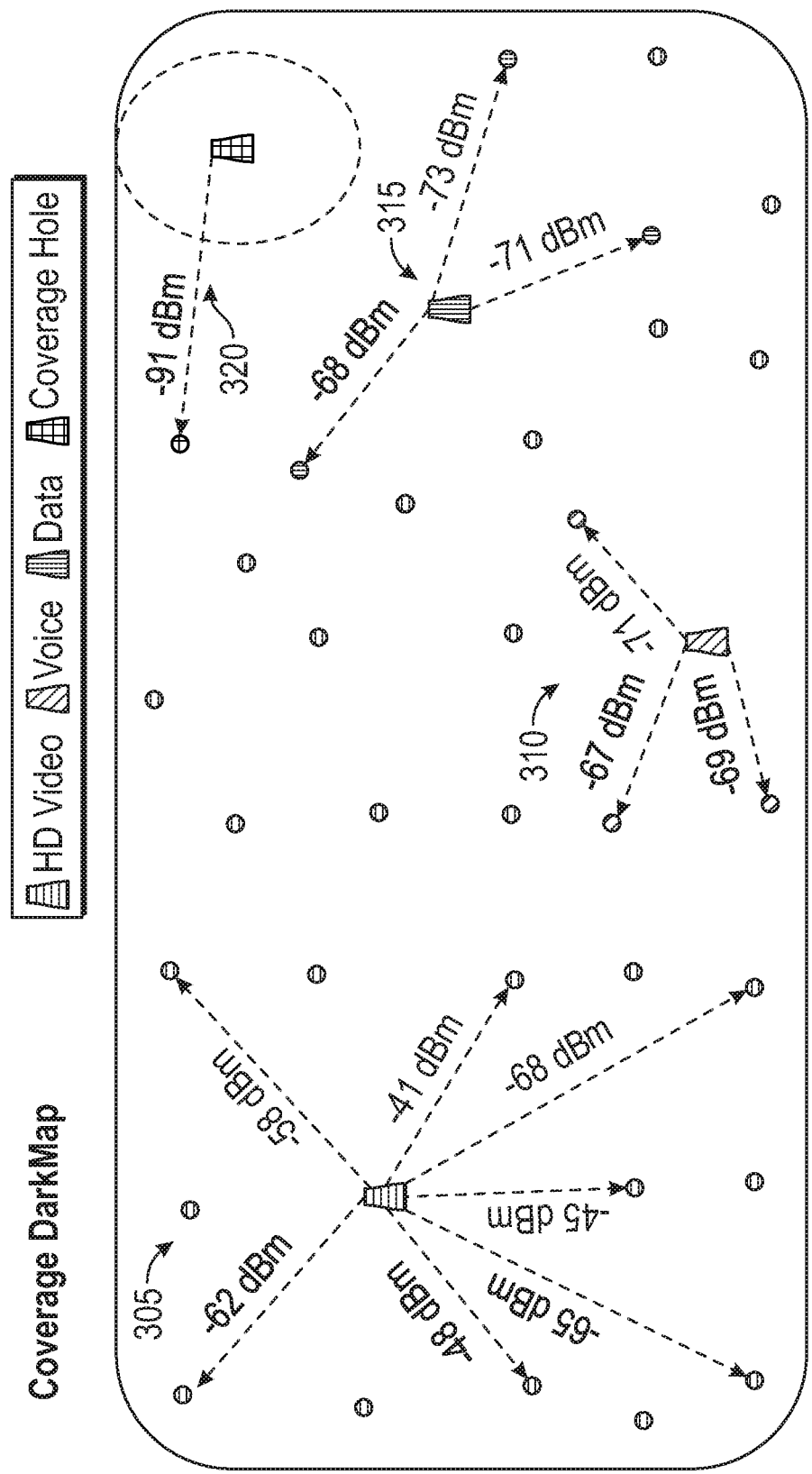
FIG. 3 illustrates coverage for a plurality of QoS levels.

FIG. 3 illustrates coverage for a plurality of QoS levels. As shown in FIG. 3, acceptable strength of signals of the APs may vary with the type of service being consumed. For example, for HD video service 305, −68 dBM may be the lowest strength of signal. A lower strength of signal may be considered a hole for HD video service. For voice service 310, −71 dBM may be the lowest strength of signal. A lower strength of signal may be considered a hole for voice service. For data service 315, −73 dBM may be the lowest strength of signal. A lower strength of signal may be considered a hole for data service. Any strength of signal lower than −91 dBM may be considered a hole for any service type 320.

Figure 4:
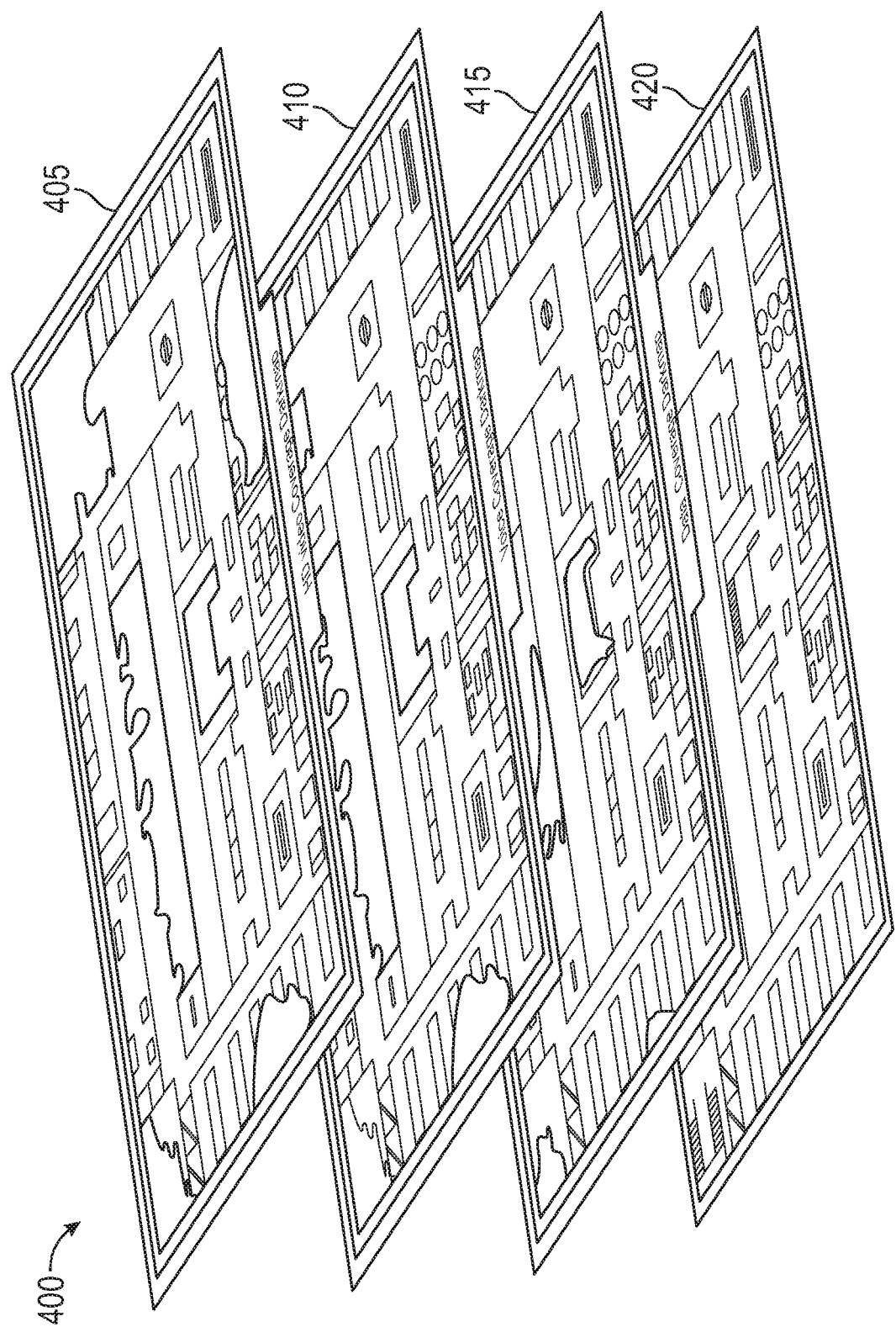
FIG. 4 illustrates a plurality of maps corresponding to a plurality of QoS levels.

FIG. 4 illustrates a plurality of maps 400 (e.g., dark maps) corresponding to a plurality of QoS levels. For example, map 405 may correspond to HD video service, map 410 may correspond to voice service, map 415 may correspond to data service, and map 420 may comprise a floor plan for the area. The dark areas in plurality of maps 400 may indicate service holes for the given service type. As can be seen from FIG. 4, the number of holes increase and grow larger as the QoS level increases from data to HD video. This may be because stronger signals may be needed for higher service quality.

In addition to the signal strengths reported by the station (e.g., station 110), mapping server 115 may use the following network parameters in order to combine both an infrastructure view and a client (i.e., station) view for more accurate QoS aware coverage dark map production. These network parameters may comprise, but are not limited to: i) Received Signal to Noise Indicator (RSNI) and Radio Signal to Interference Noise Ratio (SiNR); ii) Enhanced Distributed Channel Access (EDCA); iii) backhaul channel quality state index; iv) network contention; v) histogram of transmit data rates; and vi) channel utilization QoS Enhanced Basic Service Set (QBSS).

Regarding RSNI and Radio SiNR, mapping server 115 may first generate a QoS aware dark map leveraging the beacon report based RSNI and the radio's SiNR readings. These parameters may quantify both Uplink (UL) and Downlink (DL) quality metrics that may influence QoS. With respect to EDCA, mapping server 115 may then evaluate contention backoff parameters CWmin, CWmax, and AIFSN, for example, mapped to individual QoS access categories. These EDCA parameters may influence the amount of TxOP from the station and radio (i.e., AP) and therefore may affect overall link capacity to meet minimum QoS for the station.

With respect to backhaul channel quality state index, in service provider segments, some sites operate in Wi-Fi Mesh mode. Mesh architecture supports multi-hop deployment where only a Root Access Point has wired backhaul and the rest of the Child Mesh APs (CMAPs) have wireless backhaul links over the 2.4 GHz or 5 GHz spectrum and are therefore more susceptible to network latency. Therefore, mapping server 115 may evaluate the Backhaul Channel Quality State Index by measuring backhaul capacity along with channel state information and the number of mesh hops from the Root Access Point. For example, any CMAPs with mesh hops greater than three may fail to handle latency requirements for Voice and Video traffic.

Regarding network contention, even when wireless (e.g., Wi-Fi) UL and/or DL RSSI is strong, a station's performance may be impacted due to the amount of Wi-Fi and non-Wi-Fi interference. Hence, mapping server 115 may evaluate the amount of co-channel contention induced by nearby wireless rogue devices and persistent devices. In the presence of a Spectrum Analysis Engine (SaGE), mapping server 115 may accurately measure Interference Severity Index (ISI) metrics to determine a level of contention present at a localized RF neighborhood.

With respect to histogram of transmit data rates, for active stations associated and passing traffic, mapping server 115 may monitor a network histogram of transmit rates from nearby stations. Based on this report, mapping server 115 may quantify an average Modulation and Code Scheme (MCS) index used at different network edges.

Regarding Channel Utilization (QBSS), mapping server 115 may measure average QBSS along with TxUtil and RxUtil on an AP and its immediate close neighbors to assess total channel utilization along with Receive (UL) and Transmit (DL) utilization in a localized cluster. QBSS along with TxUtil and RxUtil may dictate overall jitter and latency and thus may have an influence on the QoS level that may be offered at a local site.

Data for the beacon reports may be continually written to mapping server 115 and statistical inference processes may be used to correct stochastic variation in both the AP signal strength (e.g., RSSI) and station location (e.g., GPS location) measurements. GPS location accuracy may vary, however, using statistical methods over time, the location and relative RSSI estimates may converge with much better accuracy giving a clear picture of the dark map.

Over time, mapping server 115 may build both the dark map (showing the coverage holes/dead zones) and also the DL signal strength observed by clients (e.g., stations) that may be near to APs (e.g., by periodically querying beacon reports from these stations). Mapping server 115 may now be able to build a service-level dark map model leveraging historical data from these devices where it may estimate levels of service that the clients can handle.

In addition, the stations (e.g., station 110) may passively forward association responses that are heard from its neighbors. Mapping server 115 may then compare these against beacon reports above, allowing it to further refine the transition maps to other wireless (e.g., Wi-Fi) systems. Based on the above information, mapping server 115 may be able to create statistical edges for WLAN 105 where different types of applications (e.g., video, voice, and data) may function to satisfaction. Once mapping server 115 creates the map (e.g., dark map) in stage 240, method 200 may then end at stage 250.

Figure 5:
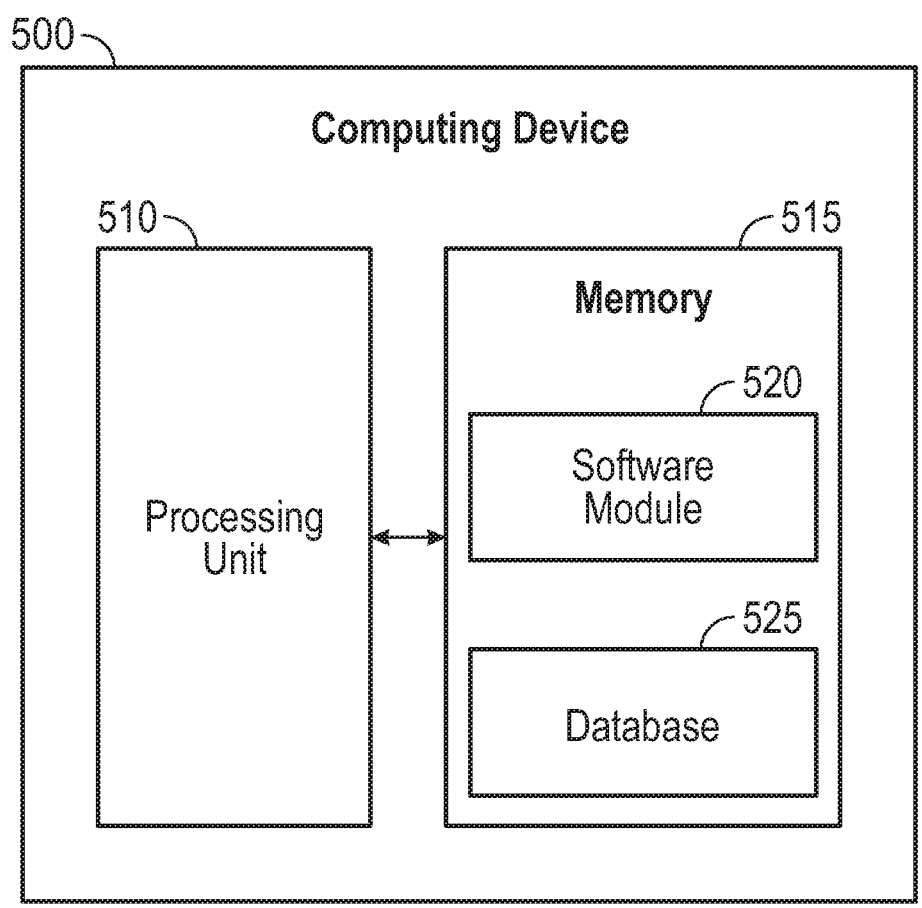
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing a Quality of Service (QoS) based wireless coverage map as described above with respect to FIG. 2. Computing device 500, for example, may provide an operating environment for station 110, mapping server 115, first AP 120, second AP 125, or third AP 130. Station 110, mapping server 115, first AP 120, second AP 125, and third AP 130 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure may comprise a method for providing a Quality of Service (QoS) based wireless coverage map. The method may comprise identifying, by an Access Point (AP) in a Wireless Local Area Network (WLAN), a station; sending, by the AP, a report request to the station in response to identifying the station; and receiving, from the station in response to the report request, a report comprising information, the information comprising a location of the station and data indicating a strength of a signal from the AP at the station.

Identifying the station may comprise determining that the station has roamed away from the AP. Identifying the station may comprise determining that the station has roamed away from the AP to a cellular network. Identifying the station may comprise determining that the station is visible by the AP and not associated with the AP.

Receiving the report may comprise receiving the report by the AP over the WLAN. The method may further comprise forwarding the report to a mapping server.

Receiving the report may comprise receiving the report by a mapping server over a cellular network. Receiving the report may comprise receiving the report wherein the information further comprises data indicating a strength of a signal from another AP at the station.

The method may further comprise creating, based on the received report, a map wherein the map indicates a hole in the coverage of the WLAN. The method may further comprise creating, based on the received report, a plurality of maps wherein each of the plurality of maps indicates a hole in the coverage of the WLAN for a corresponding plurality of service levels.

Embodiments of the disclosure may comprise a system for providing a Quality of Service (QoS) based wireless coverage map. The system may comprise a memory storage and a processing unit disposed in an Access Point (AP), the processing unit coupled to the memory storage. The processing unit may be operative to determine that a station has roamed away from the AP, send a report request to the station in response to determining that the station has roamed away from the AP, and receive, from the station in response to the report request, a report comprising information, the information comprising a location of the station and data indicating a strength of a signal from the AP at the station.

The processing unit being operative to determine that the station has roamed away from the AP may comprise the processing unit being operative to determine that the station has roamed away from the AP to a cellular network. The report may be received over a Wireless Local Area Network (WLAN) in which the AP is disposed.

The processing unit may be further operative to forward the report to a mapping server. The information may further comprise data indicating a strength of a signal from another AP at the station.

Embodiments of the disclosure may comprise a method for providing a Quality of Service (QoS) based wireless coverage map. The method may comprise determining, by a station, that the station has roamed away from an Access Point (AP) in a Wireless Local Area Network (WLAN) to a cellular network; creating, by the station in response to determining that the station has roamed away from the AP, a report comprising information, the information comprising a location of the station and data indicating a strength of a signal from the AP at the station; and sending the report to a mapping server.

The method may further comprise creating the report wherein the information may further comprise data indicating a strength of a signal from another AP at the station. Sending the report to the mapping server may comprise sending the report to the mapping server over the cellular network.

The method may further comprise creating, based on the received report, a map wherein the map indicates a hole in the coverage of the WLAN. The method may further comprise creating, based on the received report, a plurality of maps wherein each of the plurality of maps indicates a hole in the coverage of the WLAN for a corresponding plurality of service levels.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    identifying, by an Access Point (AP) in a Wireless Local Area Network (WLAN), a station wherein identifying the station comprises determining that the station has roamed away from the AP;
    sending, by the AP, a report request to the station in response to identifying the station;
    receiving, from the station in response to the report request, a report comprising information, the information comprising a location of the station and data indicating a strength of a signal from the AP at the station; and
    creating, based on the received report, a plurality of maps, wherein each of the plurality of maps indicates holes in the coverage of the WLAN for a corresponding plurality of service levels, and wherein creating the plurality of maps comprises:
        creating, based on the received report, a first map indicating first holes in the coverage corresponding to a first service level, and
        creating based on the received report, a second map indicating second holes in the coverage corresponding to a second service level, wherein the second service level is higher than the first service level, wherein the second holes are more than the first holes, and wherein the second holes are bidder than the first holes.

2. The method of claim 1, wherein identifying the station comprises determining that the station has roamed away from the AP to a cellular network.

3. The method of claim 1, wherein identifying the station comprises determining that the station is visible by the AP and not associated with the AP.

4. The method of claim 1, wherein receiving the report comprises receiving the report by the AP over the WLAN.

5. The method of claim 1, further comprising forwarding the report to a mapping server.

6. The method of claim 1, wherein receiving the report comprises receiving the report by a mapping server over a cellular network.

7. The method of claim 1, wherein receiving the report comprises receiving the report wherein the information further comprises data indicating a strength of a signal from another AP at the station.

8. A system comprising:
    a memory storage; and
    a processing unit disposed in an Access Point (AP), the processing unit coupled to the memory storage, wherein the processing unit is operative to:
        determine that a station has roamed away from the AP,
        send a report request to the station in response to determining that the station has roamed away from the AP,
        receive, from the station in response to the report request, a report comprising information, the information comprising a location of the station and data indicating a strength of a signal from the AP at the station, and create, based on the received report, a plurality of maps, wherein each of the plurality of maps indicates holes in the coverage of the WLAN for a corresponding plurality of service levels, and wherein the processing unit being operative to create the plurality of maps comprises the processing unit being operative to:

create, based on the received report, a first map indicating first holes in the coverage corresponding to a first service level, and create, based on the received report, a second map indicating second holes in the coverage corresponding to a second service level, wherein the second service level is higher than the first service level, wherein the second holes are more than the first holes, and wherein the second holes are bidder than the first holes.

9. The system of claim 8, wherein the processing unit being operative to determine that the station has roamed away from the AP comprises the processing unit being operative to determine that the station has roamed away from the AP to a cellular network.

10. The system of claim 8, wherein the report is received over a Wireless Local Area Network (WLAN) in which the AP is disposed.

11. The system of claim 8, wherein the processing unit is further operative to forward the report to a mapping server.

12. The system of claim 8, wherein the information further comprises data indicating a strength of a signal from another AP at the station.

13. A method comprising: determining, by a station, that the station has roamed away from an Access Point (AP) in a Wireless Local Area Network (WLAN) to a cellular network, creating, by the station in response to determining that the station has roamed away from the AP, a report comprising information, the information comprising a location of the station and data indicating a strength of a signal from the AP at the station; sending the report to a mapping server; and creating, based on the received report, a plurality of maps, wherein each of the plurality of maps indicates holes in the coverage of the WLAN for a corresponding plurality of service levels, and wherein creating the plurality of maps comprises: creating, based on the received report, a first map indicating first holes in the coverage corresponding to a first service level, and creating based on the received report, a second map indicating second holes in the coverage corresponding to a second service level, wherein the second service level is higher than the first service level, wherein the second holes are more than the first holes, and wherein the second holes are bigger than the first holes.

14. The method of claim 13, wherein creating the report comprises creating the report wherein the information further comprises data indicating a strength of a signal from another AP at the station.

15. The method of claim 13, wherein sending the report to the mapping server comprises sending the report to the mapping server over the cellular network.

16. The method of claim 13, wherein determining that the station has roamed away from the AP comprises determining that the station is visible by the AP and not associated with the AP.

17. The method of claim 13, wherein sending the report comprises sending the report to the AP over the WLAN.

18. The method of claim 13, further comprising forwarding the report to a mapping server.

19. The method of claim 13, wherein sending the report comprises sending the report comprises a Signal to Noise Indicator (RSNI) and a Radio Signal to Interference Noise Ratio (SiNR).

20. The method of claim 1, further comprising: refining a transition map to other wireless systems.

* * * * *